(12) United States Patent
Buchelli et al.

(10) Patent No.: US 7,709,585 B1
(45) Date of Patent: May 4, 2010

(54) ETHYLENE RECOVERY FROM A POLYMERIZATION PROCESS

(75) Inventors: Alberto Buchelli, Houston, TX (US); Ronald J. Morris, Friendswood, TX (US); William G. Todd, Victoria, TX (US); Anthony Lee Zimmermann, Victoria, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 12/454,779

(22) Filed: May 22, 2009

(51) Int. Cl.
*C08F 2/00* (2006.01)
*C08F 6/00* (2006.01)

(52) U.S. Cl. .......................... 526/77; 528/501

(58) Field of Classification Search .......... 528/501; 526/77
See application file for complete search history.

(56) References Cited

U.S. PATENT DOCUMENTS

| 2,736,756 A * | 2/1956 | Elgin ......................... 585/835 |
| 2008/0141712 A1* | 6/2008 | Verma ......................... 62/620 |

* cited by examiner

*Primary Examiner*—David Wu
(74) *Attorney, Agent, or Firm*—Roderick W. MacDonald

(57) ABSTRACT

A method for solution polymerizing ethylene wherein an ethane purge stream is separated, subjected to high efficiency cryogenic distillation, and a side cut from that distillation recycled to the polymerization process while the overhead and bottoms from that distillation are removed from the polymerization process.

9 Claims, 2 Drawing Sheets

ETHYLENE RECOVERY FROM A POLYMERIZATION PROCESS

BACKGROUND OF THE INVENTION

1. Field of the Invention

This invention relates to the solution polymerization of ethylene. More particularly, this invention relates to the recovery of ethylene for recycle purposes from such a process.

2. Description of the Prior Art

Heretofore, polyethylene has been formed by polymerizing ethylene while dissolved in a solvent such as hexane. The resulting single liquid phase solvent solution (solution or single phase solution) also contains a polymerization catalyst. The polymerization reaction is carried out in the single liquid phase containing at least ethylene and catalyst dissolved in a solvent. Optionally, one or more co-monomers can be present. For sake of clarity and brevity, this invention will be described in respect of polymerizing ethylene alone to form linear high density polyethylene (HDPE). However, one or more co-monomers can be employed in the practice of this invention.

The polymerization of the ethylene monomer is carried out using a series of stirred reactors followed by a tubular (plug flow) reactor. The plug flow reactor is employed upstream of an adsorber to accomplish product uniformity with a uniform residence time distribution for the reactants in that reactor. By "plug flow," what is meant is substantially uniform fluid velocity distribution across a transverse cross-section of a reactor, and maintenance of that flow as that fluid passes longitudinally through the reactor from its entrance to its exit. This gives all portions of that process fluid essentially uniform residence time in the reactor.

Downstream of the last (plug flow) reactor a catalyst deactivator is injected into the solution, and the resulting mixture introduced into an adsorption pressure vessel which adsorbs various compounds and decomposition components from the single phase solution. The polymerization reaction is carried out at an elevated temperature of from about 150 to about 280 degrees Centigrade (C) at a pressure of from about 2,000 to about 4,000 psig. The adsorption step of this process is also carried out in this high pressure range.

The adsorbent material used in this pressure vessel is typically a particulate material. These particles adsorb from the single phase liquid solution catalyst, various catalyst moieties, and by-products (residue) from the decomposition of the catalyst deactivator. The adsorbent is typically activated alumina particles such as alumina spheres about 1.7 millimeters in diameter.

The HDPE process must be carried out in a single phase solution. If two phases (a polymer rich phase and a separate solution rich phase) is allowed to form in the reaction zone or in the adsorption zone, a phenomenon known in the art as "frosting" or "two-phasing" occurs wherein solid polymer forms and separates out from the single phase solution. Although two-phasing is desired downstream of the reactors and adsorbers, it is not desirable in the interior of the reactors and adsorbers because solid polymer that comes out of solution and deposits in the equipment in those zones.

Process conditions such as temperature, pressure, and mass composition of the single phase solution stream can determine whether the stream will stay in the single phase or move toward two-phasing. For example, an elevated ethane content can induce two-phasing. If two-phasing is allowed to continue unchecked, the reactors, adsorbers, and/or associated equipment in which the two-phasing occurs will eventually plug up with solid polyethylene deposits thereby requiring shutdown of the plant, and clean up of at least the affected equipment, a costly event in terms of lost production and clean-up expenses.

Downstream of the adsorption step two-phasing is deliberately induced in a separation unit. This is accomplished by way of a series of de-pressurization steps to form the desired, at this point in the process, formation of distinct polymer rich and solution rich phases. In this separation step, the polymer rich phase is physically separated from the solvent rich phase. The separated polymer rich phase is processed further to provide the desired polyethylene product of the process.

The separated solvent rich phase is processed to remove impurities and to separate solvent from un-reacted ethylene so that the recovered, separate solvent and un-reacted ethylene streams can be recycled to and reused in the afore described ethylene polymerization process.

Ethane is one of the impurities formed in the foregoing polymerization process. This impurity, in part by way of the ethylene recycle stream, tends to build up in concentration in the fluid circulating in the polymerization process, and, if allowed to build up to a substantial extent, will cause polyethylene prematurely to come out of the single phase solution and cause undesired polymer plugging problems upstream of the aforesaid separation unit.

To prevent undesired build up of ethane in the polymerization process, a purge stream has heretofore been taken from the ethylene recycle stream upstream of the last step employed to remove impurities from that recycle stream before it is returned as feed to the polymerization process. In order to keep the ethane content of the polymerization process below a level where solid polyethylene prematurely separates out from the single phase solution, a purge steam of substantial volume was removed from the process. A substantial amount of un-reacted ethylene was lost with this purge stream.

It is desirable to minimize the amount of purge stream taken from the polymerization process while still maintaining the ethane content in the overall polymerization process at a level below that at which solid polyethylene forms and comes out of the single phase solution upstream of the separation step. It is also desirable to minimize the amount of ethylene lost from the polymerization process, and to improve the purity of the un-reacted ethylene that is recovered and recycled to the polymerization process. This invention accomplishes all of these desirables at the same time.

SUMMARY OF THE INVENTION

Pursuant to this invention, it has been found that by relocating the point at which the purge stream is taken from the recycle ethylene stream, and subjecting that purge stream to a high efficiency cryogenic distillation step the amount of purge stream necessarily removed from the polymerization process to prevent the premature formation of solid polyethylene in that process is reduced to a surprisingly low level, and, at the same time, a substantial amount of additional, highly purified ethylene is recovered for recycle purposes.

DETAILED DESCRIPTION OF THE INVENTION

Figure 1:
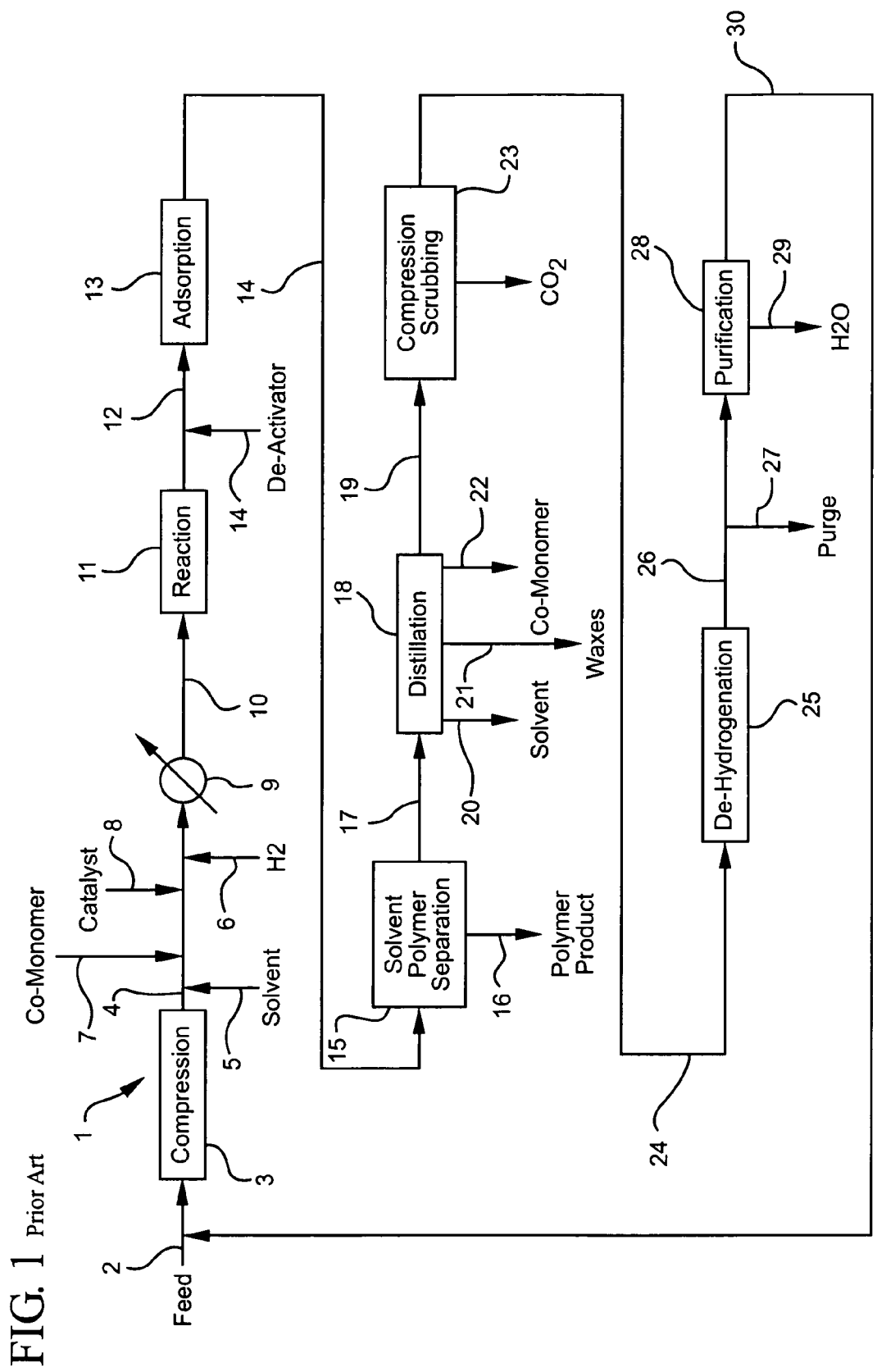
FIG. 1 shows a flow sheet for the HDPE process aforesaid.

FIG. 1 shows an ethylene polymerization process 1 wherein an ethylene monomer stream 2 is compressed at 3 and the compressed product removed into line 4. Solvent 5, e.g., hexane, and molecular hydrogen 6 (hydrogen) are added to stream 4. One or more co-monomers 7, e.g., butene or octene, can also be added to this stream, if desired. Catalyst 8, e.g., $VOCl_3$ and $TiCl_4$, and any co-catalyst, e.g., $Al(C_2H_5)_3$, is added to stream 4.

Stream 4 is heated by heat exchanger 9 to form the desired single phase solution, which is then conducted via line 10 to reactor unit 11. Unit 11 conventionally contains two continuous, stirred reactors (not shown) working in parallel and both feeding a single, continuous, stirred reactor (not shown), which, in turn, feeds a tubular reactor (not shown).

The single phase solution containing dissolved polyethylene newly formed in reactor unit 11 is passed by way of line 12 to adsorber unit 13. A catalyst deactivator 14 is injected into stream 12 upstream of adsorber unit 13. Although a variety of known deactivator materials can be employed in this invention, for sake of clarity and simplicity, the process will be described hereinafter using acetylacetone as the sole deactivator, and, acetone (an oxygenate) and acetylene as typical decomposition products (deactivator residue) of acetylacetone.

The single phase solution minus the catalyst and deactivator material adsorbed by the alumina bed of unit 13, but still containing various impurities described below in reference to stream 17 is passed by way of line 14 to a solvent/polymer separation unit 15.

In unit 15, the single phase solution from line 14 is depressurized in steps to cause two-phasing so that a phase rich in polymer and a separate phase rich in solvent is formed. The polyethylene rich phase is recovered as separate stream 16. Stream 16 is sent on for other processing to recover solid polymer, and for extrusion and melt cutting of same. The solvent rich stream is separately removed by way of line 17 and sent to a distillation unit 18.

Solvent rich stream 17 contains a major amount, i.e., greater than about 75 weight percent (wt. %), preferably greater than about 90 wt. %, of solvent and un-reacted ethylene (combined), and minor amounts (individually and combined), i.e., less than about 25 wt. %, preferably less than about 10 wt. %, of impurities. These impurities include ethane; hydrogen; $CO_2$; water; low molecular weight polymers (waxes); hydrocarbons having 4 or more carbon atoms per molecule (C4 and heavier hydrocarbons) such as butenes, pentane, solvent; and acetylacetone deactivator residue such as acetone and acetylene. This stream is recovered at a reduced temperature and pressure, e.g., about 180 C and about 192 psig.

Unless otherwise stated, all wt. % herein are based on the total weight of the stream in question.

The widely varying polymerization conditions and the wide variety of materials that can be employed prevent a precise characterization of the amounts of materials present at various stages of the polymerization process other than in terms of major and minor amounts as defined hereinabove.

Solvent rich stream 17 is subjected to a series of processing steps to remove solvent and, separately, some, but not all, impurities from that stream ultimately to produce a stream 30 that is rich in un-reacted ethylene, and that, even with its contained impurities, is suitable for recycling to the polymerization process for use as ethylene feed 2 for that process.

However, it is desirable that a recycle stream having significantly less impurities than stream 30 is available in order to improve various characteristics of the polymer produced from stream 16. For example, a recycle ethylene stream containing essentially no hydrogen is desirable because this improves the polymer melt flow rate control in reaction zone 11 and saves valuable ethylene from being converted to undesired ethane. This invention provides such a stream (stream 60, FIG. 2).

The first of the aforesaid series of processing steps involves multiple distillation procedures that are carried out in distillation unit 18. Typically, three distillation columns (not shown) are employed.

After an initial flash separation of stream 17 to remove some waxes, the distillation column that first receives stream 17 forms a first overhead stream which contains solvent and ethylene (combined) in major amount plus minor amounts (combined) of impurities including hydrogen, $CO_2$, water, C4 and heavier hydrocarbons, acetone, acetylene, and ethane, and a first bottoms stream that contains waxes, and co-monomer, if any.

This first overhead stream is passed to a separate second distillation column that forms an ethylene recycle second overhead stream 19 that contains ethylene in a major amount plus minor amounts (combined) of impurities including hydrogen, $CO_2$, water, C4 and heavier hydrocarbons, acetone, acetylene, and ethane, and a second bottoms stream 20 that consists primarily of solvent that is essentially in a form suitable for recycle to the polymerization process and re-use as solvent in that process.

The first bottoms stream is passed to a separate third distillation column that forms a third bottoms stream 21 consisting essentially of waxes suitable for combustion purposes. If a co-monomer was employed in the polymerization process, a side stream 22 can be taken from this third distillation column that consists essentially of co-monomer suitable for recycle to and re-use in the polymerization process.

That part of solvent rich stream 17 represented by stream 19, after leaving unit 18, undergoes re-compression and scrubbing (both caustic and chilled water) in unit 23 to remove most, but not all, $CO_2$ and deactivator residue, e.g., oxygenate, and produce stream 24.

Stream 24 is then passed over a hydrogenation catalyst such as a palladium containing catalyst bed in unit 25 under conditions that favor the conversion of acetylene and hydrogen present in that stream to ethane and form stream 26 which contains ethylene in a major amount, and minor, but still significant as far as polymer quality is concerned, amounts of ethane, and very minor, but still polymer significant, amounts of impurities including hydrogen, $CO_2$, water, C4 and heavier hydrocarbons, and acetone.

Stream 26 is passed to unit 28 which can contain mole sieves suitable for removing essentially all water 29 from stream 26.

The prior art removed an ethane purge stream 27 from stream 26 upstream of final purification unit 28 to reduce the ethane content in the overall polymerization system, the remainder of stream 26 being passed to unit 28. Thus, the prior art purge stream 27 was removed during the series of processing steps represented by units 15, 18, 23, 25, and 28, and upstream of the last of those units, i.e., unit 28.

Prior art purge stream 27 has essentially the same chemical composition as stream 26, and was removed in an amount sufficient to maintain the quantity of ethane in the overall polymerization process below the level at which polyethylene separates from the single phase solution upstream of the series of steps represented by units 15 through 28, and particularly in units 11 and 13.

In order to keep the ethane content of the polymerization system below that which tends to cause solid polymer to come out of solution upstream of unit 15, purge stream 27 was typically removed from the system in a substantial amount, e.g., about 1,600 pounds per hour. A substantial amount of ethylene was also removed by way of prior art purge stream 27 and thereby lost to the polymerization process.

Ethylene rich recycle stream 30 from unit 28 contains ethylene in a major amount, and, minor amounts (individually and combined) of ethane and other impurities including hydrogen, $CO_2$, C4 and heavier hydrocarbons, and deactivator residue such as one or more oxygenates.

Ethylene rich stream 30 is suitable for re-use in the ethylene polymerization process by, for example, introduction into ethylene feed stream 2 but is not as pure an ethylene stream as would be desired or as provided by this invention.

Figure 2:
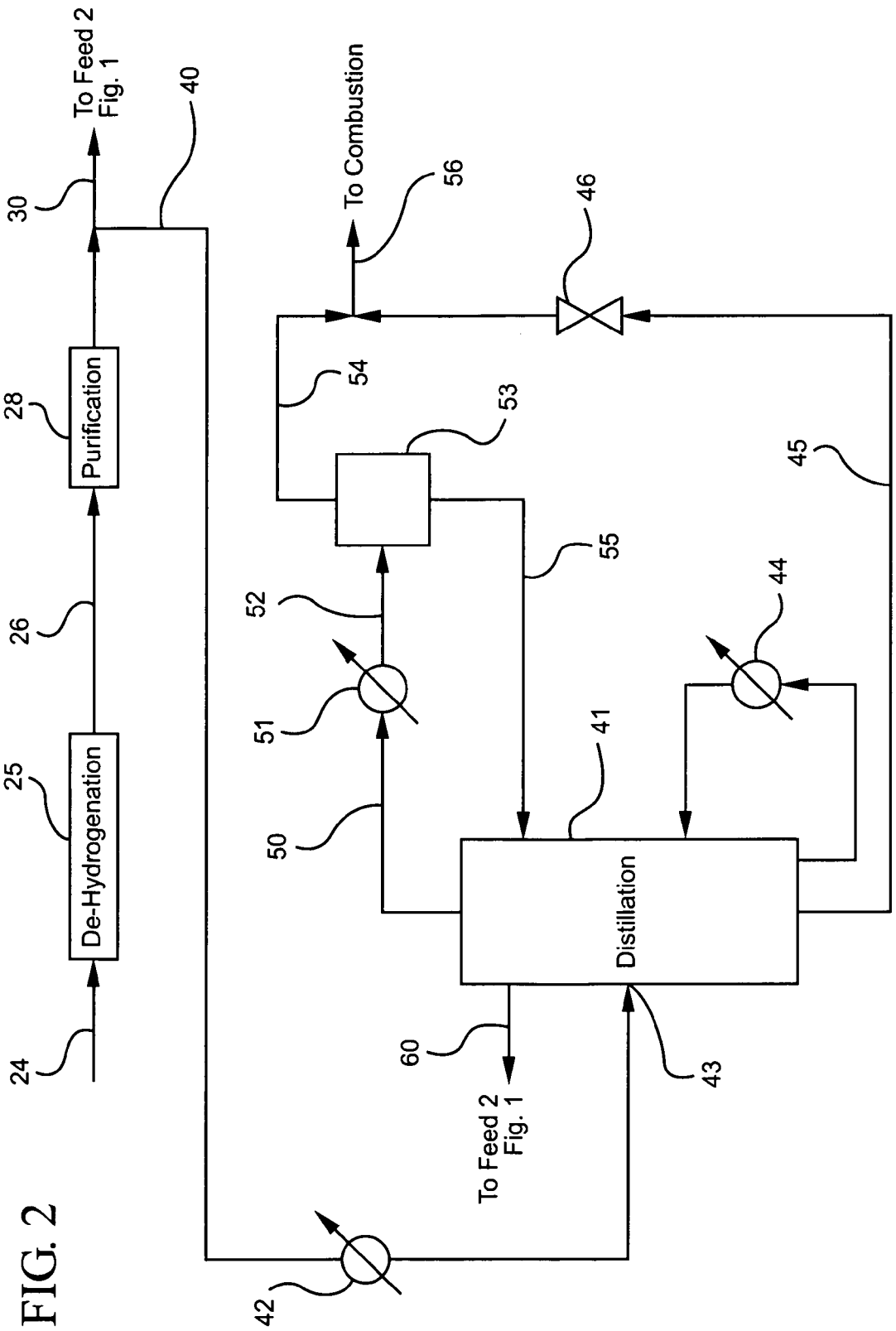
FIG. 2 shows a flow sheet demonstrating one embodiment of the inventive combination of the re-located purge stream and a purge stream high efficiency distillation column in the HDPE process of FIG. 1.

In FIG. 2, stream 24, de-hydrogenation unit 25, stream 26, purification unit 28, and stream 30 are all the same as shown in and described for FIG. 1, except, pursuant to this invention, ethane purge stream 27 is eliminated.

Pursuant to this invention, an ethane purge stream is not removed from line 26, nor from (during) any of the series of steps starting with unit 15 and ending with unit 28. Instead, with this invention, an ethane purge stream is taken from line 30 downstream of unit 28 by way of line 40 and passed to a high efficiency (minimum energy expended per pound of ethylene recovered), cryogenic distillation tower 41.

Tower 41 has at least 45 trays, or their equivalent, preferably from about 45 to about 55 trays, or their equivalent. Tower 41 is operated as a cryogenic mass transfer column using cooling unit 42 that cools gaseous ethylene rich stream 40 to a temperature that liquefies at least part of that stream, e.g., from about minus 10 to about minus 40 C.

Ethylene rich recycle feed stream 40 contains ethylene in a major amount, and, minor amounts (individually and combined) of ethane and other impurities including hydrogen, $CO_2$, C4 and heavier hydrocarbons, and acetone.

Stream 40, in a two phase state including gas and liquid, is introduced into a central portion 43 of tower 41. Tower 41 has a re-boiler 44 that maintains a tower bottom temperature of from about 15 to about 19 C at a pressure of from about 340 to about 370 psig. Tower 41 produces a liquid bottoms stream 45 and a gaseous overhead stream 50.

Bottoms stream 45 contains a major amount of ethane and minor amounts (individually and combined) of C4 and heavier hydrocarbons and deactivator residue. Stream 45 is at a temperature of from about 15 to about 19 C and a pressure of from about 340 to about 370 psig. Stream 45 is converted to the gaseous state by de-pressurization through valve 46.

Overhead stream 50 contains ethylene in a major amount together with impurities (combined and individually) including ethane, hydrogen, and $CO_2$ in the parts per million. Stream 50 is in a gaseous state at a temperature of from about minus 20 to about minus 25 C and a pressure of from about 335 to about 365 psig.

Stream 50 is converted to the liquid state using cooler 51 and passed by way of line 52 to reflux drum 53. Liquid reflux, essentially ethylene, is returned by way of line 55 to tower 41, while the gaseous overhead product from drum 53 is removed via line 54. Stream 54 contains a major amount of ethane and minor amounts (combined and individually) of ethylene, hydrogen, acetone, and $CO_2$.

Overhead stream 54 and bottoms stream 45 are combined in line 56 and removed from the polymerization system, e.g., to a flare or furnace for combustion, to reduce the ethane content of the overall polymerization system to a level below that at which solid polymer will form and separate from the single phase solution upstream of unit 15.

A side cut stream 60 is removed in the liquid state from near the top of tower 41 for return to the polymerization process, e.g., to line 2 of FIG. 1. Stream 60 is a very pure source of ethylene feed, much more pure than stream 30. Stream 60 preferably is drawn from column 41 at a point where that stream contains at least about 95 wt. % ethylene, less than about 5 wt. % ethane, and essentially no hydrogen, $CO_2$, C4 and heavier hydrocarbons, or deactivator residue. Thus, stream 60 has significantly less impurities than stream 30.

The quantity of material represented by the combination of removed overhead 54 and bottoms 45 is substantially less than, e.g., at least about 75% less than, the prior art process where somewhere during the series of steps 15, through 28 an ethane purge stream, e.g., stream 27 of FIG. 1, was removed in an amount sufficient to maintain the quantity of ethane in the polymerization process below the level at which polyethylene will separate from the single phase solution upstream of step 15.

EXAMPLE

The process shown in FIG. 1 is carried out in the manner described hereinabove using only ethylene monomer, no co-monomer, hexane solvent, acetylacetone deactivator, and a catalyst composed of effective polymerization amounts of a combination of $TiCl_4$ and $VOCl_3$.

Purge stream 40 is withdrawn from stream 30 at a rate of about 2,000 pounds per hour and is at a temperature of about 35 C. and pressure of about 750 psig as it enters tower 41 at about the center of the height of that tower. Tower 41 has a bottom temperature of about 19 C at about 355 psig.

Ethylene recycle stream 60 is withdrawn from a location near the top of tower 41 that produces a side cut stream that contains at least about 95 wt. % ethylene, less than about 5 wt. % ethane, and essentially no hydrogen, $CO_2$, C4 and heavier hydrocarbons, or acetone.

Ethylene recycle stream 60 is withdrawn from column 41 at a rate of about 1,700 pounds per hour and returned to the polymerization process as make-up feed therefore.

Overhead stream 54 and bottoms stream 45 from column 41 are combined and removed from the overall polymerization process at a rate of about 400 pounds per hour. This rate of purge stream removal is sufficient to maintain the quantity of ethane in the overall polymerization process below the level at which polyethylene will separate from the single phase solution upstream of unit 15.

The removal rate of a prior art purge stream (stream 27 in FIG. 1) that is sufficient to maintain the quantity of ethane in the polymerization process below the level at which polyethylene will separate from the single phase solution upstream of unit 15 is about 1,600 pound per hour.

Thus, the combined quantity of removed overhead and bottoms streams 45 and 54 is about 75% less than the quantity of prior art purge stream 27, while the purity of stream 60 is significantly improved over that of recycle stream 30.

We claim:

1. In a process for the solution polymerization of ethylene wherein a single phase solution containing at least ethylene and catalyst dissolved in a solvent is employed to form polyethylene dissolved in said single phase solution, said ethylene polymerization being terminated with at least one deactivator that leaves a decomposition residue, said single phase solution being subjected to a series of process steps to produce an ethylene rich stream containing ethane, hydrogen, $CO_2$, C4 and heavier hydrocarbons, and de-activator residue, said ethylene rich stream being suitable for recycling as feed to said ethylene polymerization process, the improvement comprising removing an ethane purge stream downstream of said series of steps from said ethylene rich stream, wherein no purge stream is removed during the series of steps containing ethylene, ethane, hydrogen, $CO_2$, C4 and heavier hydrocarbons, and deactivator residue, said ethane purge stream being removed in an amount sufficient to maintain the quantity of ethane in said polymerization process below the level at which polyethylene separates from said single phase solution upstream of said series of steps, cooling said removed ethane purge stream to essentially liquefy it, subjecting said liquefied ethane purge stream to distillation in a high efficiency distillation column that contains the equivalent of at least about 45 trays and produces an overhead stream and a bottoms stream, removing from said high efficiency distillation column a side cut stream that contains a major amount of ethylene, a minor amount of ethane, and essentially no hydrogen, $CO_2$, C4 and heavier hydrocarbons, and deactivator residue, recycling said side cut stream as ethylene feed to said polymerization process, and removing said overhead and bottoms streams from said polymerization process, whereby the quantity of said removed overhead and bottoms streams combined is substantially less than if an ethane purge stream was removed from said process during said series of steps in an amount sufficient to maintain the quantity of ethane in said polymerization process below the level at which polyethylene will separate from said single phase solution.

2. The method of claim 1 wherein said series of steps comprises 1) formation of a polymer rich phase and a solvent rich phase, 2) separation of said polymer rich phase and solvent rich phases from one another, said solvent rich phase containing solvent, ethylene, and impurities including ethane, waxes, hydrogen, $CO_2$, water, C4 and heavier hydrocarbons, and deactivator residue, 3) removal from said solvent rich phase of both solvent and waxes, and 4) removal from the remainder of said solvent rich phase part of said hydrogen, $CO_2$, and deactivator residue and essentially all of said water to produce said ethylene rich stream (30).

3. The method of claim 1 wherein said high efficiency distillation column overhead and bottoms streams combined constitute the sole ethane purge stream removed from said polymerization process.

4. The method of claim 1 wherein said deactivator residue is at least one oxygenate.

5. The method of claim 1 wherein said solvent is hexane.

6. The method of claim 1 wherein at least one co-monomer is employed in said polymerization process.

7. The method of claim 1 wherein said side cut stream contains at least about 95 wt. % ethylene, and less than about 5 wt. % ethane.

8. The method of claim 1 wherein the quantity of said removed overhead and bottoms streams combined is at least about 75% less than if during said series of steps an ethane purge stream was removed from said process in an amount sufficient to maintain the quantity of ethane in said polymerization process below the level at which polyethylene will separate from said single phase solution upstream of said series of steps.

9. The method of claim 1 wherein said series of steps comprises separation of said single phase solution into a polymer rich phase and a solution rich phase, distillation of said solvent rich phase to remove said solvent and said waxes, scrubbing of the remainder of said solvent rich phase to remove at least part of said $CO_2$, dehydrogenation of said remainder, and water removal from said remainder.

* * * * *